United States Patent
Schumacher (10) Patent No.: US 7,826,991 B2
(45) Date of Patent: Nov. 2, 2010

(54) TEMPERATURE-AVERAGING FIELD DEVICE COMPENSATION

(75) Inventor: Mark S. Schumacher, Chanhassen, MN (US)

(73) Assignee: Rosemount Inc., Eden Prairie, MN (US)

( * ) Notice: Subject to any disclaimer, the term of this patent is extended or adjusted under 35 U.S.C. 154(b) by 260 days.

(21) Appl. No.: 11/881,109

(22) Filed: Jul. 25, 2007

(65) Prior Publication Data

US 2009/0030634 A1 Jan. 29, 2009

(51) Int. Cl.
*G01K 15/00* (2006.01)

(52) U.S. Cl. .......................... 702/99; 702/98; 73/54.16; 73/204.19

(58) Field of Classification Search .................. 702/45, 702/47, 55, 98–100, 130, 133, 136, 138; 73/54.16, 204.19, 497, 708, 861.01; 324/633
See application file for complete search history.

(56) References Cited

U.S. PATENT DOCUMENTS

| 2,120,335 | A | * | 6/1938 | Lederer | 338/10 |
|---|---|---|---|---|---|
| 4,878,039 | A | * | 10/1989 | Kraemer | 338/26 |
| 5,117,216 | A | | 5/1992 | McQueen | |
| 5,167,153 | A | | 12/1992 | McQueen | |
| 5,279,161 | A | | 1/1994 | Glassey et al. | |
| 5,438,866 | A | | 8/1995 | McQueen | |
| 6,327,915 | B1 | * | 12/2001 | Van Cleve et al. | 73/861.357 |
| 6,510,740 | B1 | | 1/2003 | Behm et al. | |
| 6,519,546 | B1 | | 2/2003 | Eryurek et al. | |
| 6,776,045 | B2 | * | 8/2004 | Fernald et al. | 73/705 |
| 6,843,139 | B2 | | 1/2005 | Schumacher et al. | |
| 6,977,575 | B2 | | 12/2005 | Bernier | |
| 7,046,180 | B2 | | 5/2006 | Jongsma et al. | |
| 2005/0120789 | A1 | * | 6/2005 | Matsumoto et al. | 73/204.15 |
| 2007/0127546 | A1 | * | 6/2007 | Gul | 374/147 |

* cited by examiner

*Primary Examiner*—Manuel L Barbee
(74) *Attorney, Agent, or Firm*—Kinney & Lange, P.A.

(57) ABSTRACT

An average-temperature compensated field device comprises a field module, a temperature-averaging sensor, a microprocessor, and an interface. The field module is configured to characterize a process parameter. The temperature-averaging sensor is configured to generate a compensation signal characterizing an extended region of the field device. The microprocessor is configured to compensate a process signal as a function of the compensation signal. The interface is configured to communicate the process signal via a field device communication protocol.

16 Claims, 6 Drawing Sheets

TEMPERATURE-AVERAGING FIELD DEVICE COMPENSATION

BACKGROUND

This invention relates generally to temperature compensation of field devices, and in particular to compensation utilizing a temperature-averaging sensor that characterizes an extended region of the field device.

The term "field device" refers to a broad range of process management devices designed to measure and control process parameters such as pressure, temperature and flow rate. Field devices include both transmitters, which are configured to measure or sense a process parameter with a sensor module, and controllers, which are configured to modify or control such a parameter with a control module (for example, by positioning a valve or regulating a pressure). Field devices also include multi-sensor transmitters such as pressure/temperature transmitters, and integrated controllers comprising both sensor modules and control modules (for example, integrated flow controllers). Field devices can also utilize more generalized field modules, which can incorporate a range of related measurement and control functions (as, for example, in an integrated hydrostatic tank gauge system).

Field devices have broad utility in applications that include manufacturing, fluid processing, food preparation and environmental control, and are applied to a wide range of process materials including air, water, liquid hydrocarbon fuels, natural gas, glues, resins, thin films, and thermoplastics such as polyvinyl chloride (PVC). Most of these applications require at least some form of temperature compensation, which in general must address both direct and indirect effects. Direct effects include temperature dependencies in the process material itself, particularly with respect to pressure and volume-related measurements. Indirect effects include temperature dependencies in the field device, such as thermoelectric sensor response, temperature dependencies in analog-to-digital (A/D) or digital-to-analog (D/A) converters, and other related effects.

Direct temperature compensation requires measurement of the process material, which often implicates large inventories and flow volumes. This is particularly true, for example, in energy-sector applications like petroleum refining and bulk fuel transportation, where process temperatures may vary substantially even within a single flow unit or storage volume. Direct temperature compensation therefore employs multi-spot temperature sensors, or, alternatively, temperature-averaging sensors that characterize an extended region of the process material.

Temperature compensation directed toward field devices, on the other hand, has traditionally relied upon single-spot compensation sensors. Field devices are generally small as compared to typical process volumes, and, in the idealized case, temperatures may not vary significantly on this scale. Moreover, because field devices emphasize simple, compact, and robust design methods, it can in any case be difficult for them to incorporate complex multi-spot compensation systems.

Nonetheless, under actual operating conditions significantly non-uniform temperature conditions do arise. Process heat flow, maintenance operations, and changing ambient conditions all produce temperature gradients, which can sometimes exceed 10-20° C. across a typical field device. Under such conditions a single-point sensor may not adequately characterize the field device, resulting in signal drift, bias, and other effects. Thus there remains a need for a temperature compensation technology that can overcome this deficiency, and so improve upon the prior art.

SUMMARY

An average-temperature compensated field device utilizes a sensor module to characterize a process parameter associated with a process material, and a temperature-averaging sensor to characterize an extended region within the field device. The sensor module and temperature-averaging sensor produce analog signals, which are digitized by an analog-to-digital (A/D) converter. A microprocessor generates a compensated output as a function of the digitized signals, and an interface transmits the output utilizing a commercially-available communication protocol.

In various embodiments the sensor module comprises a pressure transducer, a thermocouple transducer, a flow meter, a level sensor, or another form of sensor. Alternatively, the field device is a multi-sensor device, combining a number of such functionalities. The temperature-averaging sensor typically comprises a flexible resistance-temperature device (or RTD), and the communication protocol is a standard analog protocol, a hybrid analog-digital (or HART®) protocol, or a digital protocol such as Fieldbus, and employs either a wireless or hard-wired control bus technology.

An average-temperature compensated controller comprises the average temperature sensor, an electronics module, and a control module. The electronics module is configured to receive a process control input, and to generate a compensated control output as a function of the process control input and the compensation signal from the temperature-averaging sensor. The control module is configured to influence a process parameter as a function of the compensated control output. In various embodiments the control module comprises a temperature controller, a pressure regulator, or a fluid level controller. In other embodiments the control module comprises a valve positioner or a valve actuator, and the controller further comprises a sensor module configured to characterize a flow rate. In these embodiments the controller comprises an integrated flow controller.

A method of temperature-averaging field device compensation comprises generating a process signal that characterizes a process parameter, sensing an average temperature over an extended region of the field device, compensating the process signal as a function of the average temperature, and generating an output as a function of the compensated process signal. In one embodiment the process signal comprises a sensor signal, and the output comprises a compensated output. In another embodiment the process signal comprises a process control input, and the output comprises a compensated process control output. Alternatively, the field device is an integrated controller, which combines such functionalities.

DETAILED DESCRIPTION

Figure 1A:
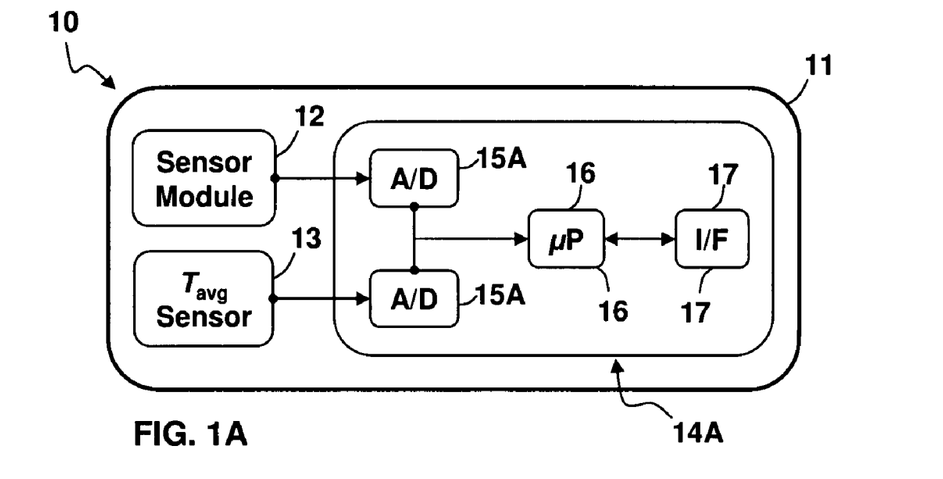
FIG. 1A is a block diagram of an average-temperature compensated transmitter.

FIG. 1A is a block diagram of average-temperature compensated transmitter 10. Transmitter 10 is a field device comprising housing 11, primary measurement sensor ("sensor module") 12, temperature-averaging sensor ("$T_{avg}$ sensor") 13 and electronics module 14A.

Housing 11 is comprised of a durable material such as metal or a durable plastic. The housing comprises internal mounting structures configured to secure internal components including sensors 12 and 13, and electronics module 14A. Housing 11 insulates these internal components, shields them from adverse environmental conditions such as moisture or corrosive agents, and protects them from contact with process machinery, tools, falling objects, or other potential hazards. Housing 11 also provides coupling structures configured to couple transmitter 11 to a process structure containing a process material.

Sensor module 12 is configured to generate an analog sensor signal that characterizes a physical parameter (a process parameter) associated with the process material. In various embodiments, for example, sensor module 12 comprises a pressure sensor such as a piezoresistive pressure sensor, a capacitive pressure sensor, or an electromechanical pressure sensor, each of which are configured to characterize (or measure) a process pressure. Alternatively, sensor module 12 comprises a temperature sensor such as a thermocouple temperature transducer, a flow meter such as a mass flow meter, a fluid level sensor, or another form of sensor. Transmitter 10 also has multi-sensor embodiments, such as a pressure/temperature transmitter which comprises a number of sensor modules 12.

Temperature-averaging sensor ($T_{avg}$ sensor) 13 comprises a temperature-responsive element such as a resistance-temperature device (an RTD). Temperature-averaging sensor 13 has an extended sensitivity area, as distinguished from single-spot (or single-point) sensors in the prior art, and from multi-spot (or multi-point) sensors comprising a number of discrete single-spot sensors. Sensor 13 generates an analog compensation signal that characterizes an extended region within transmitter 10, providing a more representative compensation signal that is adaptable to a variety of field module geometries and field device applications.

In embodiments where sensor module 12 comprises a thermocouple temperature transducer, $T_{avg}$ sensor 13 facilitates cold-junction compensation. Because $T_{avg}$ sensor 13 is not limited in sensitivity to a single point proximate the thermocouple, however, it is also configurable to characterize temperature-dependent components in electronics module 14A, or other temperature-dependent elements of the field device. The $T_{avg}$ sensor is further configurable to characterize regions of housing 11 that are proximate a process material, such that $T_{avg}$ sensor 13 also characterizes a process temperature.

Electronics module 14A comprises analog-to-digital converters (A/Ds) 15A, microprocessor 16 and interface (I/F) 17. In some embodiments the electronics module also comprises pre-amplifier components for pre-amplifying analog signals from sensor module 12 and $T_{avg}$ sensor 13. Alternatively, sensor module 12 or $T_{avg}$ sensor 13 comprise integrated preamplifier components.

A/Ds 15A digitize analog signals from primary sensor 12 and $T_{avg}$ sensor 13. The A/Ds have linear, bilinear and non-linear embodiments, as appropriate to the particular sensitivity and scale range of sensor module 12 and $T_{avg}$ sensor 13. The A/Ds are variously flash A/Ds, utilize sigma-delta modulation, or employ another conversion architecture, as available from a variety of commercial vendors. In some embodiments electronics module 14A comprises a unitary A/D 15A, configured to digitize signals from both primary sensor 12 and $T_{avg}$ sensor 13.

Microprocessor 16 clocks A/D 15A, and, optionally, sets A/D parameters such as bilinear breakpoint or conversion scale. The microprocessor also compensates the digitized sensor signal as a function of the digitized compensation signal, generating a compensated sensor output. Typically, compensation is initially performed as a pre-calibrated (factory-set) function of the digitized signals, but both transmitters and other, more generalized field devices typically provide for field-based calibrations as well.

Microprocessor 16 provides the compensated sensor output to interface (I/F) 17. Microprocessor 16 is also configurable to provide the compensation signal, in either digital or analog form, as well as a date stamp, a time stamp, or diagnostic signals representing the operating state of primary sensor 12 and $T_{avg}$ sensor 13. In some embodiments, microprocessor 16 comprises additional functionality to linearize the sensor signal, re-range the transmitter, adjust damping characteristics, or provide additional diagnostic signals.

Interface 17 transmits the compensated output to a handheld controller, a remote operator, or an automated control system such as DeltaV, as available from commercial vendors including Emerson Process Management. In one embodiment, I/F 17 supports a Profibus/Fieldbus communication protocol, which is a bi-directional digital protocol. In other embodiments, I/F 17 supports a standard 4-20 mA analog signal protocol, or a hybrid protocol such as HART®, which superimposes digital communications on the standard analog signal. The interface is also configurable to communicate via a wireless radio-frequency (RF) transmitter, for example a 902-928 MHz signal compatible with a HART-based 1420 Wireless gateway, also available from Emerson Process Management.

In operation of transmitter 10, primary sensor 12 and $T_{avg}$ sensor 13 provide analog signals to A/D 15A. Microprocessor 16 clocks the A/Ds, which digitize the analog signals, converting them to digital signals. Microprocessor 16 compensates the digital sensor signal as a function of the digital compensation signal, generating a compensated sensor output for I/F 17. The interface transmits the compensated output according to one or more of the communication protocols described above.

In the HART and Fieldbus embodiments, I/F 17 receives digital control signals, which are used to request an A/D clock by microprocessor 16, to provide A/D conversion parameters, to set date and time stamp information, to facilitate calibration or diagnostics, or for other process management and control purposes. In these embodiments I/F 17 can also transmit various diagnostic signals in digital form.

Figure 1B:
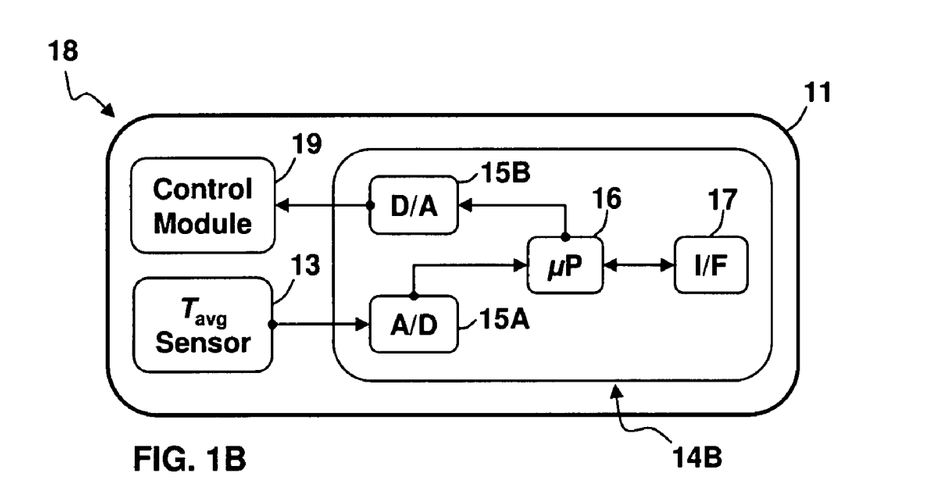
FIG. 1B is a block diagram of an average-temperature compensated field device.

FIG. 1B is a block diagram of average-temperature compensated controller 18. In this embodiment, controller 18 is a field device comprising housing 11, $T_{avg}$ sensor 13, electronics module 14B and control module 19.

Housing 11 and $T_{avg}$ sensor 13 are operable as described above with respect to transmitter 10 of FIG. 1A. In contrast to transmitter 10, however, controller 18 comprises electronics module 14B, not electronics module 14A, and control module 19, not sensor module 12.

Electronics module 14B comprises A/D 15A, microprocessor 16 and I/F 17, and may comprise pre-amplifier components as described above. Electronics module 14B also comprises digital-to-analog (D/A) converter 15B.

Control module 19 variously comprises, for example, a commercially available temperature controller, a pressure regulator, a fluid level controller, a valve positioner, a valve actuator, or a flow controller. Alternatively, control module 19 is a more generalized field module with both measurement and control functionality, such as a component of a hydrostatic tank gauge system. Regardless of particular embodiment, however, control module 19 applies temperature-dependent measurement and control technology to temperature-dependent process parameters, and so benefits from temperature compensation analogous to that described above for sensor module 12 and transmitter 10.

In operation of field device 18, I/F 17 is configured to receive a process control input via a standard analog, HART, or Fieldbus communication protocol. Microprocessor 16 compensates the control signal as a function of the compensation signal from $T_{avg}$ sensor 13, and then clocks D/A converter 15B in order to produce a compensated (analog) control output for control module 19. The compensation function is either factory calibrated or field calibrated, or depends upon a combination of such calibrations as described above.

The compensated control output comprises a current level, a variable-width electronic pulse, a pneumatic pressure, or another control output. Control module 19 is configured to influence the process parameter as a function of the control output, for example by actuating or positioning a valve, or by providing current to a resistive heater. Essentially, whereas a sensor module is configured to passively characterize a process parameter (that is, by measuring it), control module 19 is configured to actively characterize the parameter (that is, by physically influencing or altering it).

Note that FIGS. 1A and 1B are merely representative of a wide range of potential embodiments. In particular, the advantages of average-temperature-based compensation are equally applicable to transmitters, controllers, multi-sensor transmitters, integrated controllers and other, more generalized field devices, and to both commercially-available and custom-designed systems.

Figure 2:
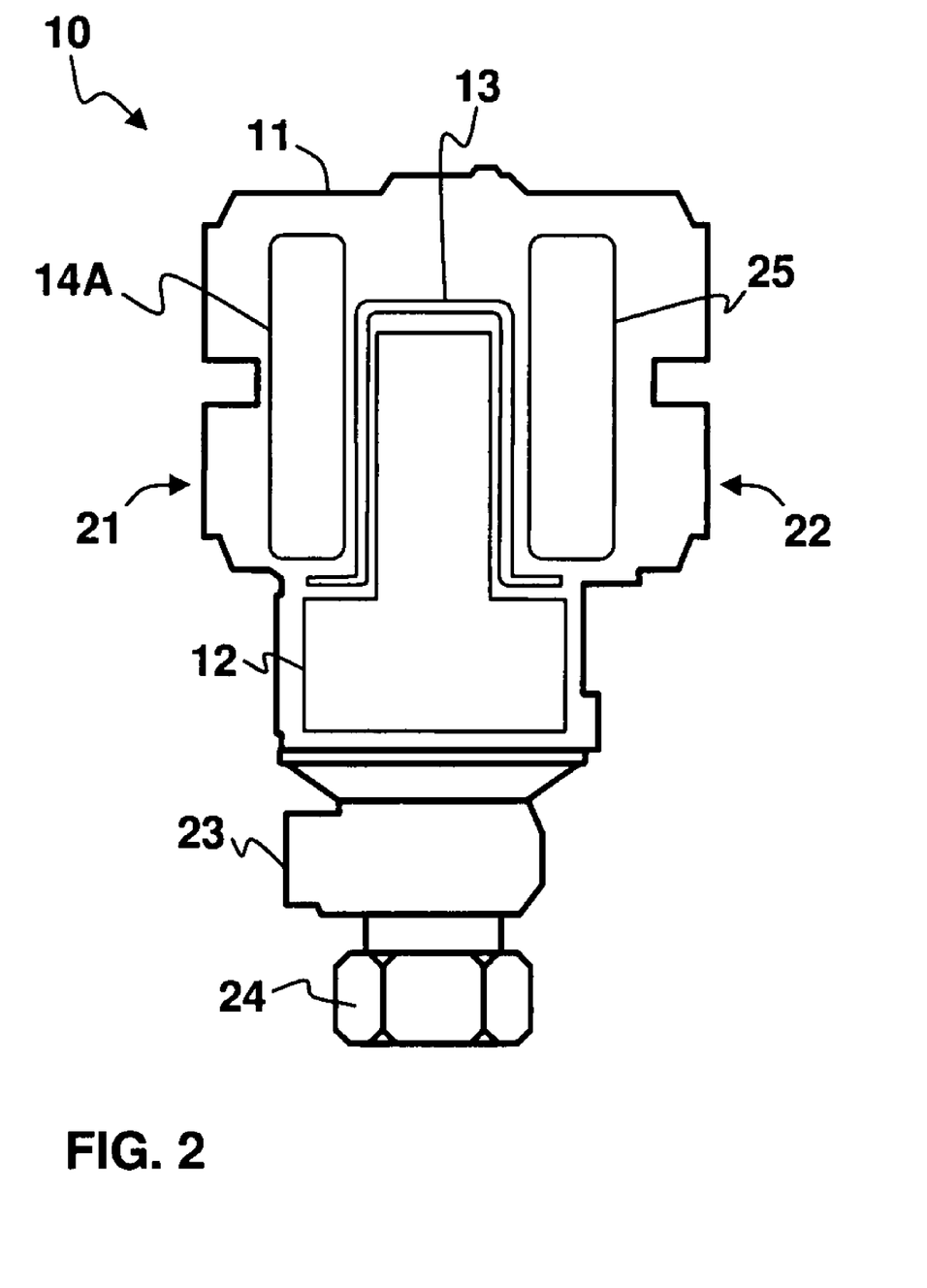
FIG. 2 is a cross-sectional schematic of the transmitter in FIG. 1, in a pressure-sensing embodiment.

FIG. 2 is a cross-sectional schematic of transmitter 10, in a pressure-sensing embodiment. In this embodiment transmitter 10 comprises a 3051T-series capacitive-type pressure transmitter and temperature-averaging sensor 13. The 3051T is available from Rosemount, Inc., of Chanhassen, Minnesota, a division of Emerson Process Management.

In the embodiment of FIG. 2, housing 11 comprises transmitter cover 21, terminal cover 22, mounting element 23, and coupling nut 24. Within housing 11 are comprised internal transmitter elements including sensor module 12, $T_{avg}$ sensor 13, electronics module 14A and, in this embodiment, terminal block 25.

The relative sizes, shapes and positions of the components in FIG. 2 illustrate a range of potential field device configurations, of which the 3051T-series transmitter is merely one example. FIG. 2 does nonetheless demonstrate general advantages of the temperature-averaging compensation technique disclosed herein, which are inherent in all potential embodiments.

Specifically, $T_{avg}$ sensor 13 is configured to generate a compensation signal that characterizes an extended region of transmitter 10, or of any generalized field device. For example, $T_{avg}$ sensor 13 is configurable to simultaneously characterize temperatures proximate both sensor module 12 and electronics module 14A, as well as regions of housing 11 proximate other temperature-dependent components, or, alternatively, a process material. This adaptability is particularly important when the field device is subject to non-uniform temperature effects.

Figure 3A:
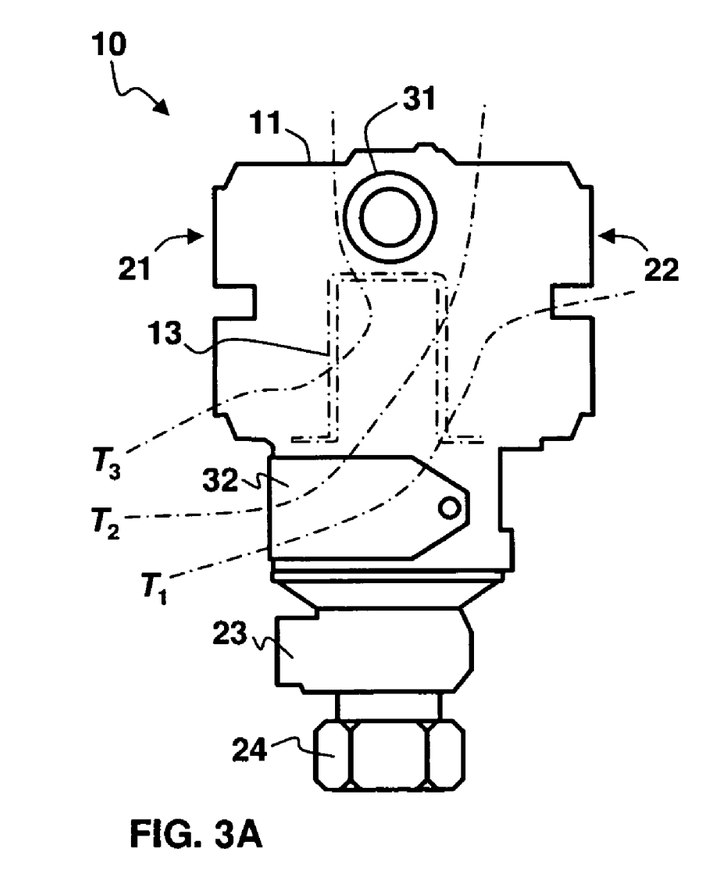
FIG. 3A is side view of the pressure transmitter in FIG. 2, subject to a drift-inducing (time-dependent) temperature gradient.

FIG. 3A is a side view of transmitter 10 as embodied in FIG. 2, subject to a drift-inducing (time-dependent) temperature gradient. Transmitter 10 comprises $T_{avg}$ sensor 13, shown in phantom, and housing 11. Housing 11 comprises covers 21 and 22, mounting element 23, coupling nut 24, conduit connection 31 and nameplate 32. Other internal elements of transmitter 10 are described above with respect to FIG. 2, but are not shown in FIG. 3A.

The temperature gradient is described by isotherms $T_1$, $T_2$ and $T_3$, which characterize a non-uniform temperature gradient that generally decreases from the top left of FIG. 3A toward the bottom right (that is, with $T_1<T_2<T_3$). Such gradients arise, for example, from time-dependent change in ambient temperature due to the introduction of a radiant heat source such as sunlight, a change in process heat flow, or another time-dependent effect.

Single-spot temperature compensation techniques, as are typical of the prior art, require a compromise between the optimal placement for temperature equilibrium (that is, when the temperature is the same everywhere inside the field device), and the unpredictable effects of non-uniform operating conditions like those in FIG. 3A. In particular, single-spot sensors may produce signal drift due to transient (time-dependent) variations between the temperature at the sensor, and temperatures at other elements of the field device. This causes the compensation signal to depart from its "true" or nominal value, which in turn causes the sensor output to drift.

Temperature-averaging sensor 13 is less subject to signal drift, because its extended sensitivity region simultaneously characterizes different temperature regions across the gradient. This provides a more representative compensation signal, and allows for faster response to changing temperatures. In a flexible-sensor embodiment, furthermore, $T_{avg}$ sensor 13 can be conformed to the geometry of almost any field device, and specifically configured for both equilibrium and non-equilibrium temperature conditions.

Figure 3B:
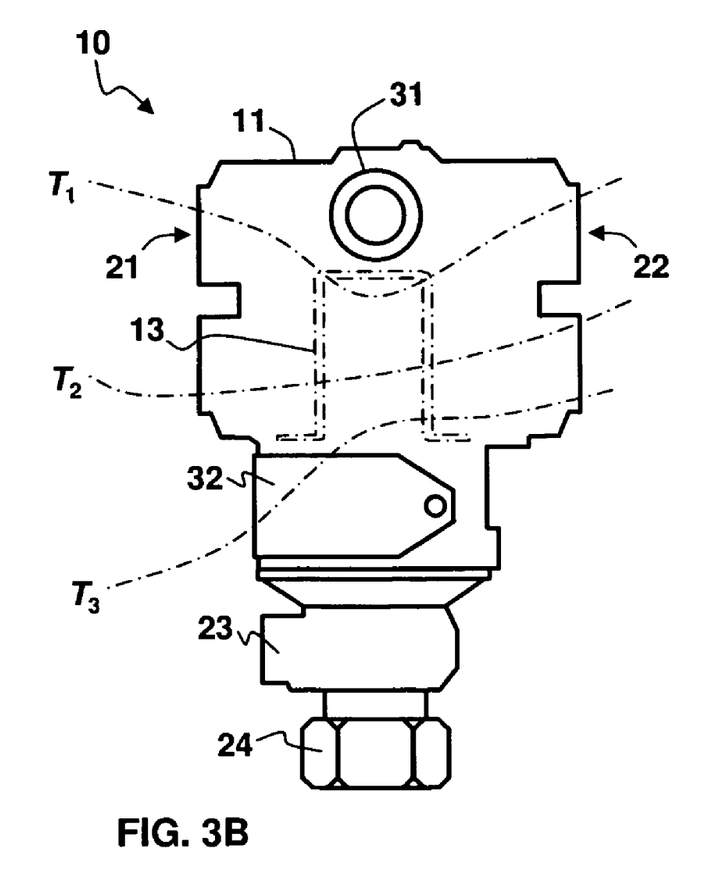
FIG. 3B is a side view of the pressure transmitter in FIG. 2, subject to a bias-inducing (quasi-steady-state) temperature gradient.

FIG. 3B is a side view of transmitter 10 in the embodiment of FIG. 2, subject to a bias-inducing (quasi-steady-state) temperature gradient. Here, the temperature decreases from the bottom of FIG. 3A toward the top (again, with $T_1<T_2<T_3$). Such gradients arise from a quasi-steady-state flow of process heat through transmitter 10, or from another heat flow.

Quasi-steady-state gradients like that in FIG. 3B can induce signal bias. Bias (or "offset") is similar to signal drift, in that it results from a difference between the temperature at a single-spot compensation sensor and temperatures at other components of the field device. Signal bias can be more persistent than signal drift, however, because a quasi-steady-state heat flow tends to produce a more stable gradient, which may not decrease with time.

Temperature-averaging sensor 13 is less subject to bias than the prior art, because it has an extended sensitivity area that yields a more representative compensation signal than a single-spot sensor. $T_{avg}$ sensor 13 is moreover configurable to provide a single compensation signal in a unified, compact package, as opposed to more complex multi-spot (multi-point) systems that require a number of discrete single-spot components.

Figure 4A:
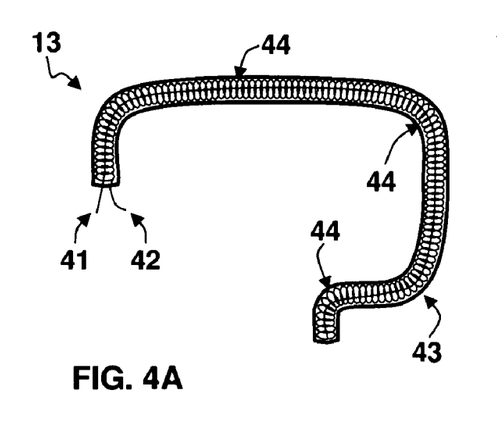
FIG. 4A is a schematic illustration of a flexible and generally linear temperature-averaging sensor having substantially uniform sensitivity.

FIG. 4A is a schematic illustration of temperature-averaging sensor 13, in a flexible, generally linear embodiment having substantially uniform sensitivity. In this embodiment sensor 13 comprises a resistance-temperature device (RTD), which in turn comprises lead wires 41 and 42, sheath 43 and substantially uniform wire core 44.

Lead wires 41 and 42 are electrically coupled to opposite ends of wire core 44, such that lead wires 41 and wire core 44 form an electrical path along the length of $T_{avg}$ sensor 13. Connections between the lead wires and external electronics are discussed with respect to FIGS. 5A-5C, below.

Sheath 43 is configured to protect and electrically insulate wire core 44. The sheath comprises a flexible conduit, a flexible hose, a flexible plastic coating, or another form of sheath material. The cross-sectional geometry of sheath 43 is variously substantially circular, substantially oblong, or otherwise, such that sheath 43 generally conforms to the cross-sectional geometry of wire core 44.

Wire core 44 is a resistive conducting wire core, comprised of DIN-grade (or European standard) platinum, reference-grade (at least 99.999% pure) platinum, nickel, copper, a nickel/iron alloy, or another material with temperature-dependent resistivity. Wire core 44 is typically wound around an insulating core winding (which is not shown), or, alternatively, coiled within a mandrel (also not shown). Such wire cores are provided with RTDs available from Weed Instruments of Round Rock, Tex.; RdF Corporation of Hudson, New Hampshire; Emerson Process Management, and other commercial vendors. Sheath 43, wire core 44 and the core winding or mandrel are typically flexible, allowing $T_{avg}$ sensor 13 to conform to a variety of field device geometries as discussed above.

In the embodiment of FIG. 4A, wire core 44 is substantially uniform, being wound with substantially the same density throughout the extent of $T_{avg}$ sensor 13. This provides a simple RTD geometry and a uniformly-weighted average temperature compensation signal, which is sampled approximately equally along the entire sensitive region of sensor 13.

Figure 4B:
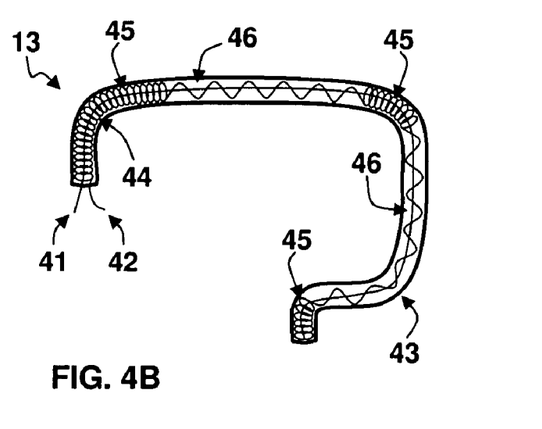
FIG. 4B is a schematic illustration of a flexible and generally linear temperature-averaging sensor having preferential sensitivity.

FIG. 4B is a schematic illustration of $T_{avg}$ sensor 13, in a flexible, generally linear embodiment having preferential sensitivity. In this embodiment lead wires 41 and 42 and sheath 43 are as described above with respect to FIG. 4A, but wire core 44 is not substantially uniform. Instead, wire core 44 comprises a number of extended sensitivity regions 45, where the wire core is relatively densely wound, and a number of less sensitive regions 46, where the wire core is less densely wound, and, in some embodiments, replaced by a less temperature-sensitive material.

The preferential-sensitivity embodiment of FIG. 4B provides additional adaptability to non-uniform temperature gradients, such as those illustrated by FIGS. 3A and 3B. In general, extended sensitivity regions 45 are positioned proximate substantially temperature-sensitive components of the field device, so that the compensation signal preferentially characterizes these elements. Thermal couplings between sensor 13 and temperature-sensitive components can also be provided, with similar effect. This provides additional flexibility in tailoring sensor 13 to the geometry and operating characteristics of any particular field device, while retaining a simple, single-signal, unitary-element design.

Figure 4C:
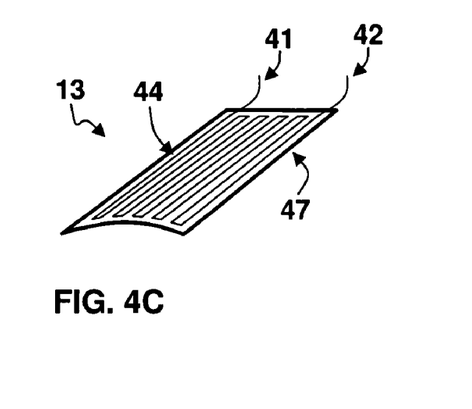
FIG. 4C is a schematic illustration of a flexible and generally planar temperature-averaging sensor having substantially uniform sensitivity.

FIG. 4C is a schematic illustration of $T_{avg}$ sensor 13, in a flexible, generally planar embodiment having substantially uniform sensitivity. In this embodiment, sensor 13 comprises a thin-film RTD, which in turn comprises lead wires 41 and 42 and substantially uniform thin-film wire core 44, typically formed by deposition on substrate 47. In general there will also be a protective and insulating coating on top of the wire core, but this is not shown in FIG. 4C.

Figure 4D:
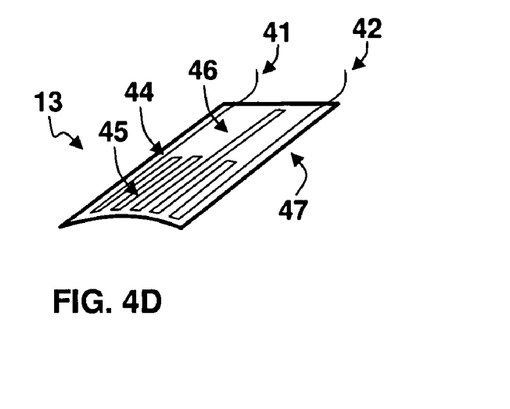
FIG. 4D is a schematic illustration of a flexible and generally planar temperature-averaging sensor having preferential sensitivity.

FIG. 4D is a schematic illustration of $T_{avg}$ sensor 13 in a flexible, generally planar embodiment having preferential sensitivity. In this embodiment the wire core has extended sensitivity regions 45 and less sensitive regions 46, analogous to those shown in FIG. 4B.

FIG. 4C and FIG. 4D illustrate embodiments suitable for micro-fluidics and other small-scale applications, for flexible, thin-wall field devices, and for other applications where component size and thickness are important factors. These embodiments are typically formed on a flexible substrate such as a polyimide film, as available from 3M Corporation of St. Paul, Minn. Alternatively, non-flexible planar embodiments are formed on a rigid substrate such as a silicon-based substrate or a ceramic substrate.

Figure 5A:
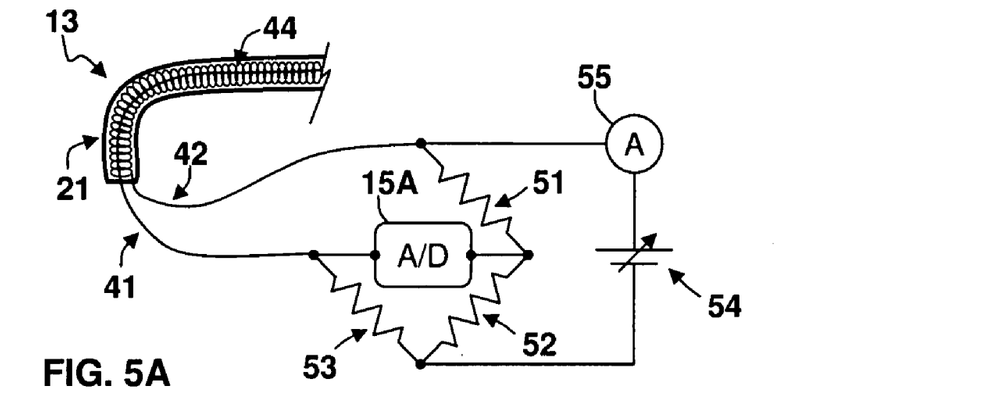
FIG. 5A is a schematic illustration showing the temperature-averaging sensor of FIG. 4A, with a two-wire bridge output configuration.
Figure 5B:
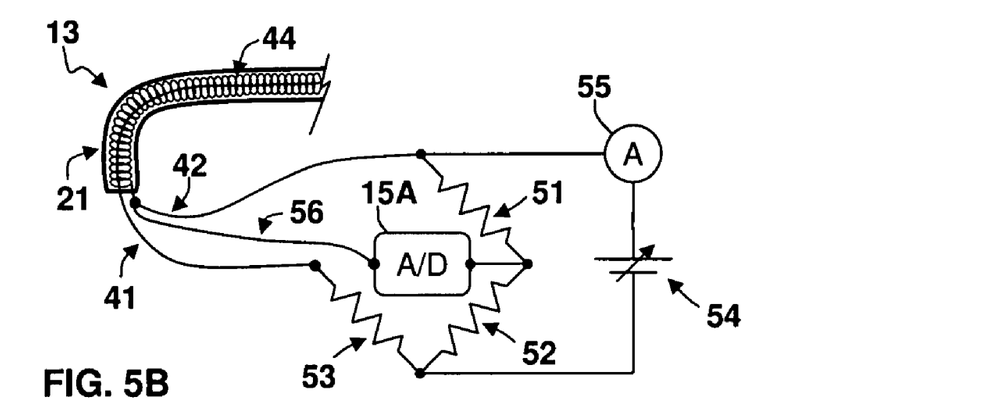
FIG. 5B is a schematic illustration showing the temperature-averaging sensor of FIG. 4A, with a three-wire bridge output configuration.
Figure 5C:
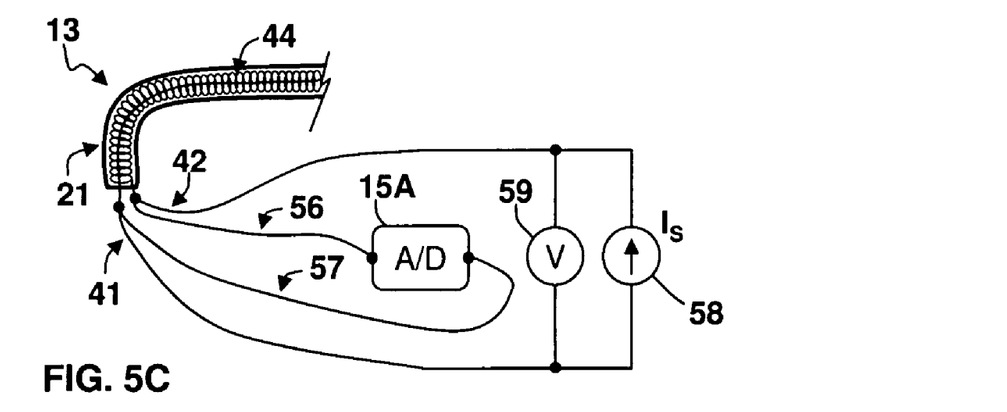
FIG. 5C is a schematic illustration showing the temperature-averaging sensor of FIG. 4A, with a four-wire output configuration.

FIGS. 5A-5C illustrate various output wiring configurations for temperature-averaging sensor 13. The $T_{avg}$ sensor is shown in a generally linear, flexible and uniform-sensitivity RTD embodiment (see FIG. 4A), but this is merely illustrative. These wiring configurations are equally applicable to flexible and rigid embodiments, to generally linear or generally planar embodiments, and to other sensor geometries.

FIG. 5A is a schematic illustration showing $T_{avg}$ sensor 13, with a two-wire bridge output configuration. In this embodiment the output wiring comprises lead wires 41 and 42, which are connected across wire core 44, and bridge resistors 51, 52, and 53. Variable voltage supply 54 and ammeter 55 are comprised within microprocessor 16.

The two-wire bridge provides a relatively simple, robust output wiring configuration. Bridge resistors 51, 52 and 53 are coupled to lead wires 41 and 42, and to A/D converter 15A. Variable potential supply 54 provides current through $T_{avg}$ sensor 13, as limited by bridge resistor 53. The average temperature along the RTD is a function of the resistance of wire core 44, which is determined from Ohm's Law:

$$R = \frac{V}{I}. \tag{1}$$

Voltage V is determined by A/D 15A, and current I is determined by potential supply 54 as regulated via ammeter 55 (alternatively, by a regulated current supply as described in the embodiment of FIG. 5C, below).

FIG. 5B is a schematic illustration showing $T_{avg}$ sensor 13, with a three-wire bridge output configuration. As compared to the two-wire bridge of FIG. 5A, the three-wire bridge requires third lead wire 56. The three-wire bridge reduces the effect of series resistance in lead wires 41 and 42, yielding a signal at A/D 15A which is largely independent of this effect.

FIG. 5C is a schematic illustration showing $T_{avg}$ sensor 13, with a four-wire output configuration. This configuration requires both third lead wire 56 and fourth lead wire 57, which reduce the effect of mismatched lead resistances. There are no bridge resistors in this embodiment, and variable potential supply 54 and ammeter 55 are replaced by regulated current supply 58 and voltmeter 59, respectively.

As indicated by FIGS. 5A-5C, RTDs are subject to self-heating due to the current through wire core 44 as provided by voltage supply 54 (or, in FIG. 5C, current supply 58). The degree of self-heating is the power delivered to the wire core; that is, $$P = IV, \quad [2]$$

where P is the self-heating power, which depends upon current I and voltage V.

Self-heating causes the wire core to have a slightly higher temperature than its surrounding environment, which changes its resistance and so introduces a self-heating component into the compensation signal. Self-heating can be corrected for by determining the self-heating index (SHI), which is simply the slope of the (approximately linear) relationship between RTD resistance and self-heating power. That is, $$SHI = \frac{R_1 - R_2}{P_1 - P_2}, \quad [2]$$

where $R_1$ and $R_2$ are the resistances corresponding to power levels $P_1$ and $P_2$, respectively.

Essentially, the SHI is the ratio of the change in resistance to the change in self-heating power. The self-heating power is found via Eq. 2, using current I and voltage V as measured across the RTD, and the resistance is found via Ohm's Law (Eq. 1). Once the SHI is determined the RTD signal can be corrected for any current I and any voltage V, by reducing resistance R by ΔR in proportion to the self-heating power:

$$\Delta R = SHI \times P. \quad [2]$$

Figure 6A:
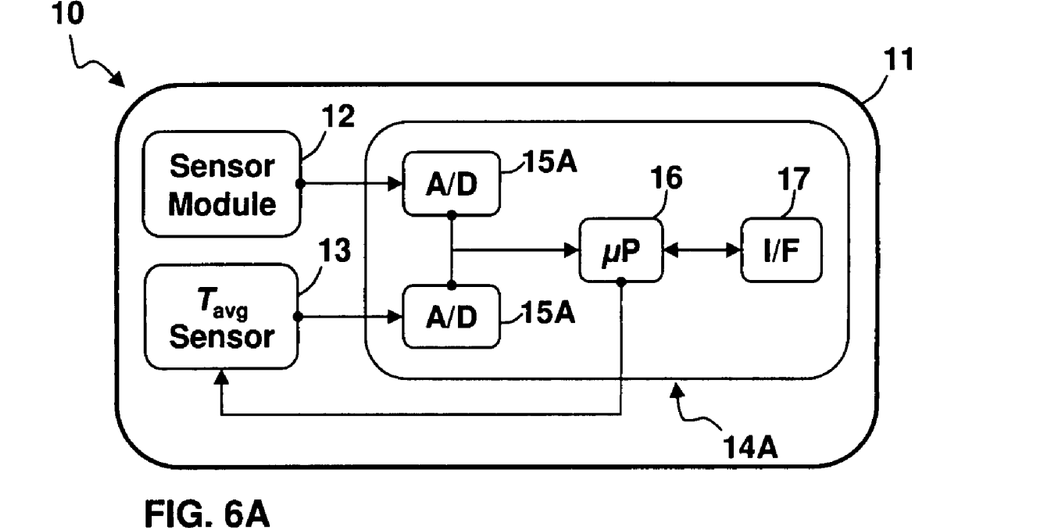
FIG. 6A is a block diagram of the transmitter of FIG. 1A, in an auto-corrected embodiment.

FIG. 6A is a bock diagram of transmitter 10, in an auto-corrected embodiment. In this embodiment microprocessor 16 further comprises variable potential supply 54 and ammeter 55 as illustrated in FIGS. 5A and 5B, or, alternatively, regulated current supply 58 and voltmeter 59 as illustrated in FIG. 5C.

To autocorrect $T_{avg}$ sensor 13 for the effects of self-heating, microprocessor 16 provides two different currents through the wire core, and calculates the self-heating index (SHI) via Eq. 3. The self-heating index is then used in the compensation function to correct resistance R for the effect of current flow through $T_{avg}$ sensor 13, using Eq. 4 or another similar algorithm. This reduces the effect of self-heating on the compensation signal, and provides for a more accurate compensated sensor output.

Figure 6B:
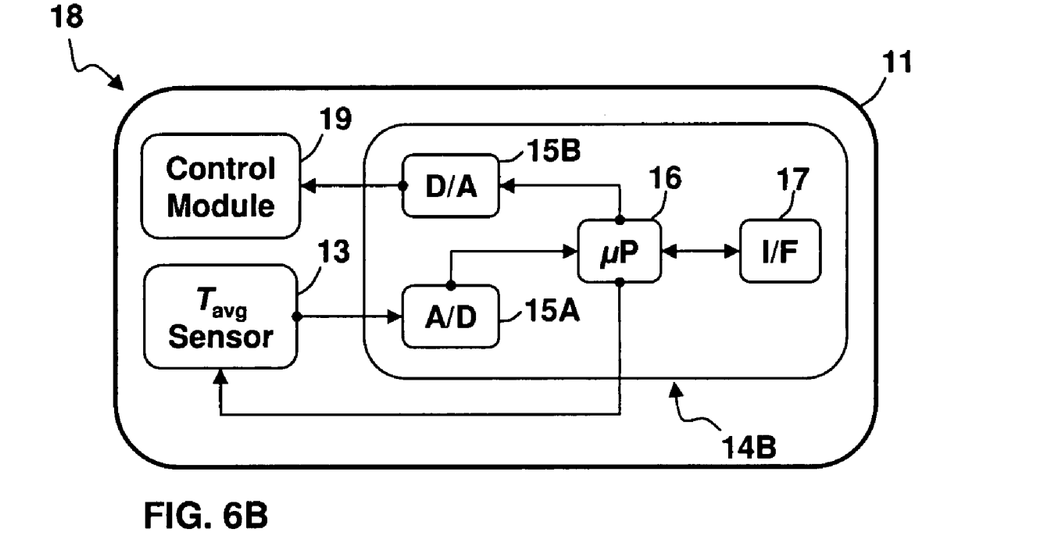
FIG. 6B is a bock diagram of the controller of FIG. 1B, in an auto-corrected embodiment.

FIG. 6B is a block diagram of controller 18, in an auto-corrected embodiment. In this embodiment microprocessor 16 further comprises variable potential supply 54 and ammeter 55 as illustrated in FIGS. 5A and 5B, or, alternatively, regulated current supply 58 and voltmeter 59 as illustrated in FIG. 5C. Microprocessor 16 is operable to autocorrect $T_{avg}$ sensor 13 as described immediately above.

The autocorrected embodiments of FIGS. 6A and 6B are particularly appropriate to research and other high-precision applications. Because changes in the SHI also indicate degradation of or failure in the wire core, however, the autocorrected embodiments also provide an important diagnostic tool for $T_{avg}$ sensor 13. This diagnostic has broader applications in industrial fluid processing, hydrocarbon refining and storage, bulk fluid transport and other applications where temperature compensation plays a process-critical role.

The present invention has been described with reference to preferred embodiments. Workers skilled in the art will recognize that changes may be made in form and detail without departing from the spirit and scope of the invention.

The invention claimed is:

1. An average-temperature compensated transmitter comprising:
    a sensor module for generating a sensor signal characterizing a process parameter;
    a unitary temperature-averaging sensor having an extended sensitivity area for generating an average temperature compensation signal characterizing an extended region of the transmitter;
    a controller for generating a compensated output as a function of the sensor signal and the average temperature compensation signal; and
    an interface for transmitting the compensated output via a field device communication protocol;
    wherein the temperature-averaging sensor characterizes temperatures proximate the sensor module and proximate a temperature-dependent electronic component of the controller; and
    wherein the extended sensitivity area of the temperature-averaging sensor characterizes regions at different temperatures when the controller is subject to a drift-inducing temperature gradient due to changing ambient temperature.

2. The transmitter of claim 1, wherein the sensor module comprises a pressure sensor for generating a process pressure signal and the temperature-dependent electronic component comprises an A/D converter for digitizing the process pressure signal.

3. The transmitter of claim 1, wherein the sensor module comprises a temperature sensor for generating a process temperature signal and the temperature-dependent electronic component comprises an A/D converter for digitizing the process temperature signal.

4. The transmitter of claim 1, wherein the temperature-averaging sensor comprises a resistance-temperature device having a wire core wound or coiled inside a flexible sheath, and wherein the wire core comprises at least one of DIN-grade platinum, reference-grade platinum, nickel, copper, or a nickel/iron alloy.

5. The transmitter of claim 4, wherein the wire core is wound with substantially uniform density over the extended sensitivity area, in order to generate a uniformly-weighted average temperature compensation signal over the extended region of the transmitter.

6. The transmitter of claim 4, wherein the resistance-temperature device is electrically coupled to one of a two-wire output bridge and a three-wire output bridge.

7. The transmitter of claim 4, further comprising a current supply connected to the resistance-temperature device for calculating a self-heating index to auto-correct for self-heating.

8. The transmitter of claim 1, wherein the temperature-averaging sensor comprises a flexible wire core wound or coiled inside a flexible sheath.

9. The transmitter of claim 1, wherein the temperature-averaging sensor comprises a thin-film wire core formed on a generally planar and flexible substrate.

10. The transmitter of claim 1, wherein the extended region of the transmitter comprises regions at different temperatures when the transmitter is subject to a bias-inducing temperature gradient due to heat flow.

11. The transmitter of claim 10, wherein the extended sensitivity area of the temperature-averaging sensor characterizes the regions at different temperatures when the transmitter is subject to the heat flow.

12. An average-temperature compensated transmitter comprising:
   a sensor module for generating a sensor signal characterizing a process parameter;
   a unitary temperature-averaging sensor having an extended sensitivity area for generating an average temperature compensation signal characterizing an extended region of the transmitter;
   a controller for generating a compensated output as a function of the sensor signal and the average temperature compensation signal; and
   an interface for transmitting the compensated output via a field device communication protocol;
   wherein the temperature-averaging sensor characterizes temperatures proximate the sensor module and proximate a temperature-dependent electronic component of the controller;
   wherein the temperature-averaging sensor comprises a resistance-temperature device having a wire core wound or coiled inside a flexible sheath, and wherein the wire core comprises at least one of DIN-grade platinum, reference-grade platinum, nickel, copper, or a nickel/iron alloy; and
   wherein the wire core is relatively densely wound proximate the temperature-dependent electronic component and relatively less densely wound in a less sensitive region, such that the wire core is preferentially sensitive over the extended sensitivity area, in order to preferentially characterize temperature-sensitive components of the transmitter.

13. An average-temperature compensated flow controller comprising:
   a sensor module for characterizing a process flow rate;
   a unitary temperature-averaging sensor having an extended sensitivity area for generating an average temperature compensation signal characterizing an extended region of the flow controller;
   an electronics module for receiving a process control input and generating a compensated control output as a function of the process control input and the average temperature compensation signal; and
   a control module for controlling the process flow rate as a function of the compensated control output;
   wherein the unitary temperature-averaging sensor characterizes temperatures proximate the sensor module and proximate a temperature-dependent component of the electronics module.

14. The flow controller of claim 13, wherein the temperature-dependent component comprises a D/A converter for generating the compensated control output, and wherein the control module comprises at least one of a valve positioner or a valve actuator for controlling the process flow rate based on the compensated control output.

15. The flow controller of claim 13, further comprising a current supply connected to the resistance-temperature device for calculating a self-heating index to auto-correct for self-heating.

16. The flow controller of claim 13, wherein the extended region of the flow controller comprises regions at different temperatures when the flow controller is subject to a bias-inducing temperature gradient due to heat flow, and wherein the temperature-averaging sensor characterizes the regions at different temperatures when the controller is subject to the heat flow.

* * * * *